United States Patent

Liu

[11] Patent Number: 5,972,257
[45] Date of Patent: Oct. 26, 1999

[54] PROCESS FOR MAKING A FOAMED SHOE SOLE

[76] Inventor: Kun-Chung Liu, No. 5, Alley 9, Lane 212, San-Feng Rd., Hou-Li Hsiang, Taichung Hsien, Taiwan

[21] Appl. No.: 09/157,622

[22] Filed: Sep. 21, 1998

[51] Int. Cl.$^6$ .............................. B29C 44/02; B29C 44/06
[52] U.S. Cl. ...................... 264/40.4; 264/45.1; 264/46.4; 264/51; 264/54; 264/161
[58] Field of Search ................................. 264/45.1, 46.4, 264/51, 54, 40.4, 161

[56] References Cited

U.S. PATENT DOCUMENTS

| | | | |
|---|---|---|---|
| 4,418,483 | 12/1983 | Fujita et al. ............................ | 264/45.1 |
| 5,141,578 | 8/1992 | Yang ..................................... | 264/45.1 |
| 5,308,420 | 5/1994 | Yang ..................................... | 264/45.1 |
| 5,318,645 | 6/1994 | Yang ..................................... | 264/45.1 |
| 5,560,877 | 10/1996 | Yung et al. ............................. | 264/51 |
| 5,814,254 | 9/1998 | Bisconti ................................. | 264/46.4 |

*Primary Examiner*—Allan R. Kuhns
*Attorney, Agent, or Firm*—Baker & Botts, L.L.P.

[57] ABSTRACT

A process for making a foamed shoe sole includes (a) forming at least one unexpanded blank in at least one first mold by introducing thereinto a resinous molding composition, which includes an agent capable of expanding and cross-linking the resinous molding composition, at a temperature lower than that which can cause the composition to expand and cross-link; b) trimming the unexpanded blank to remove flash and inspecting the weight and size of the unexpanded blank; and (c) placing in a second mold the unexpanded blank having a predetermined weight and size and heating the unexpanded blank under pressure at a high temperature sufficient to cause the unexpanded blank to undergo expansion and cross-linking, whereby the sole so produced has good cross-linking characteristics and retains exactly the shape and size of the mold cavity of the second mold. Preferably, the resinous composition contains polyethylene vinyl acetate.

9 Claims, 6 Drawing Sheets

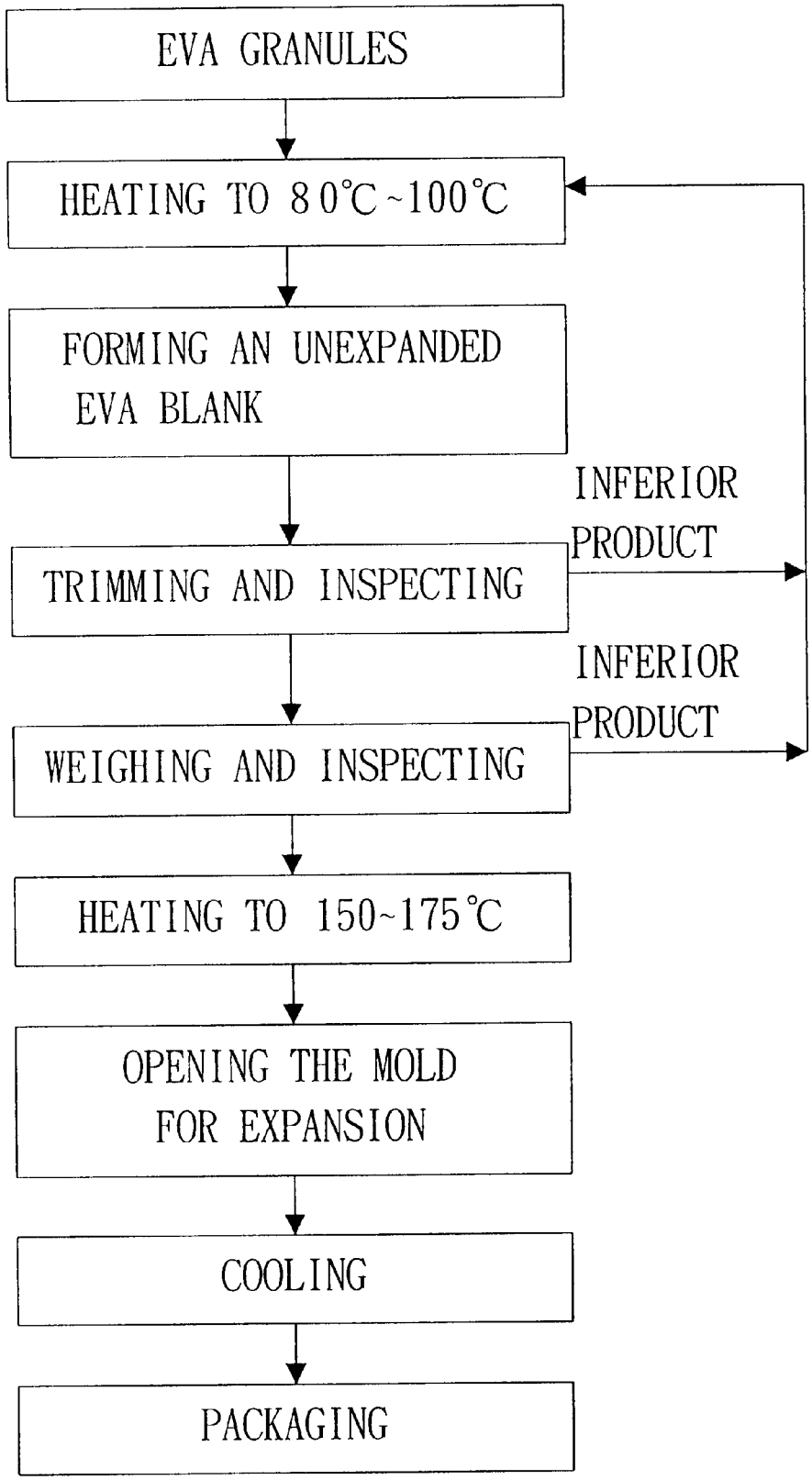
F I G. 3

PROCESS FOR MAKING A FOAMED SHOE SOLE

BACKGROUND OF THE INVENTION

1. Field of the Invention

This invention relates to a process for making a shoe sole, more particularly to a process for making a foamed shoe sole from a foamable polymeric molding composition, such as that containing polyethylene vinyl acetate.

2. Description of the Related Art

Polymeric foams, such as polyethylene vinyl acetate foams, are widely used in making shoe soles. Many processes have been developed in the art in relation to the production of shoe soles from polyethylene vinyl acetate foams. Conventionally, soles are produced from a foamable polyethylene vinyl acetate (EVA) composition via a single-stage forming process, wherein melted EVA composition is introduced into a mold under high temperature and pressure to undergo cross-linking and expansion. For crosslinking and expanding, an EVA composition generally requires a blowing agent, such as azodicarbonamide which not only produces nitrogen and carbon dioxide gases, but also cross-links the EVA polymer. As shown in FIG. 1, a typical process comprises melting an EVA molding material in the form of granules, and injecting the same into a mold at a temperature of 160° C.–175° C. followed by cooling of the molded product for about 4 hours until room temperature (23° C.) is reached. In this process, the temperature at which the molding material is injected should essentially be set at a high temperature of 160° C.–175° C. so as to decompose the blowing agent for cross-linking and expanding. A period of up to 420–540 sec under a pressure of 6.5 kg/cm$^2$ is required to complete the cross-linking reaction in the mold. After a high pressure and high temperature cross-linking stage, the mold is opened momentarily to allow the molding composition to expand to a greatest volume (about 1.5–2 times the original volume), thereby obtaining a semi-finished product. The temperature at which the semi-finished product is taken out from the mold is about 95° C.–100° C. After cooling to room temperature, the semi-finished product is set to provide a final product.

The above-mentioned process is simple and can be carried out at a low cost, but it suffers from several problems. One of the problems is that the mold for forming the EVA sole has to be free of residual air in order to prevent oxidation of the EVA molding composition in the mold. Such an oxidation will especially occur at the indented parts of the mold as designated by (p) in FIG. 2. Numeral 10 and 11 in FIG. 2 respectively represent the mold and the sole. Upon oxidation, a yellow color that indicates an incomplete cross-linking could result in the sole. In order to expel the residual air, a common practice is to apply vacuum to the mold, or to introduce nitrogen gas into the mold. However, the resulting effect thereof is limited because the mold is not completely sealed.

The presence of air in the mold can also cause the problem of under-filling the mold due to the internal pressure induced by the residual air. The under-filling problem occurs especially at the location where the cross-section of the cavity of the mold has a sudden change, or when the injection rate or pressure is considerably high under poor venting conditions. Under-filling will result in products with insufficient hardness, non-uniform density, and poor skin characteristics. Moreover, as it is difficult to control the amount of the molding material introduced into the mold due to the aforesaid problems, the conventional process usually does not provide products with uniform shape and size. In addition, re-melting or re-molding of defective products for recycle is impossible since the products have been cross-linked.

SUMMARY OF THE INVENTION

An object of the present invention is to provide an improved process for making a foamed shoe sole by which the above-mentioned problems can be eliminated.

According to the present invention, a process for making a foamed shoe sole comprises:

(a) forming at least one unexpanded blank in at least one first mold by introducing thereinto a resinous molding composition, which includes an agent capable of expanding and cross-linking the resinous molding composition, at a temperature lower than that which causes the composition to expand and cross-link;

(b) trimming the unexpanded blank to remove flash and inspecting the weight and size of the unexpanded blank; and (c) placing in a second mold the unexpanded blank having sufficient weight and/or size and heating the unexpanded blank under pressure at a high temperature sufficient to cause the unexpanded blank to undergo expansion and cross-linking, whereby the sole so produced has good cross-linking characteristics and retains exactly the shape and size of the mold cavity of the second mold. Preferable, the resinous composition contains polyethylene vinyl acetate.

Other features and advantages of the present invention will become apparent in the following detailed description of the preferred embodiments with reference to the accompanying drawings, of which:

BRIEF DESCRIPTION OF THE DRAWINGS

FIG. 3 is a flow diagram illustrating a first preferred embodiment of the present invention;

DETAILED DESCRIPTION OF PREFERRED EMBODIMENTS

Figure 1:
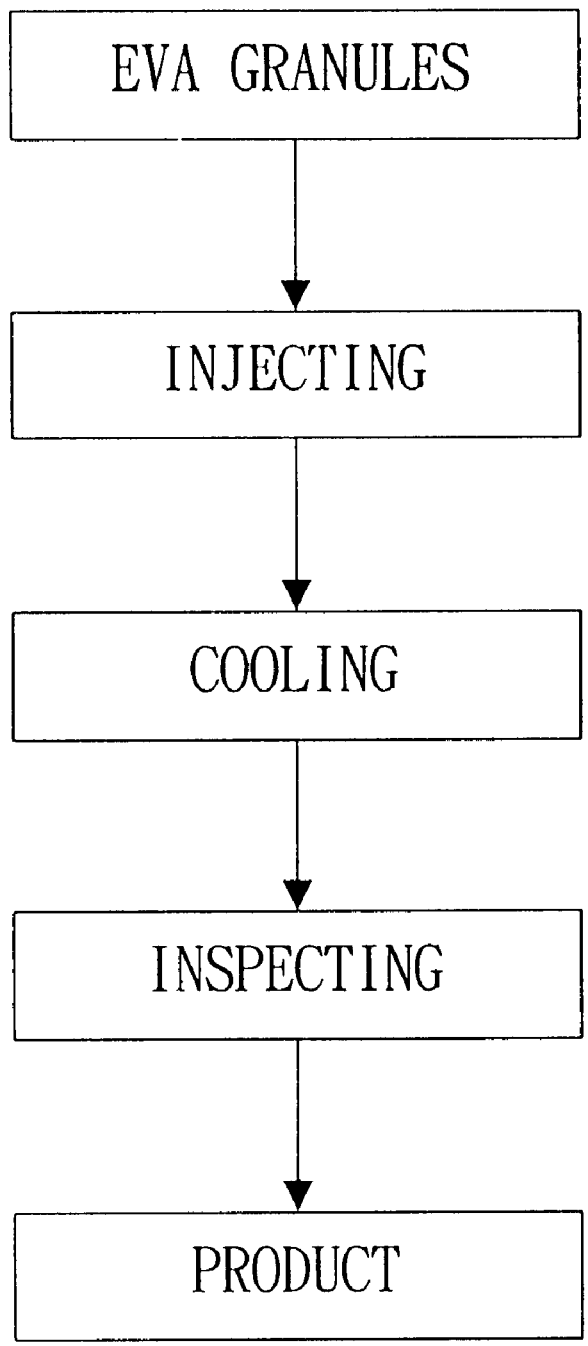
FIG. 1 is a flow diagram illustrating a conventional process.
Figure 2:
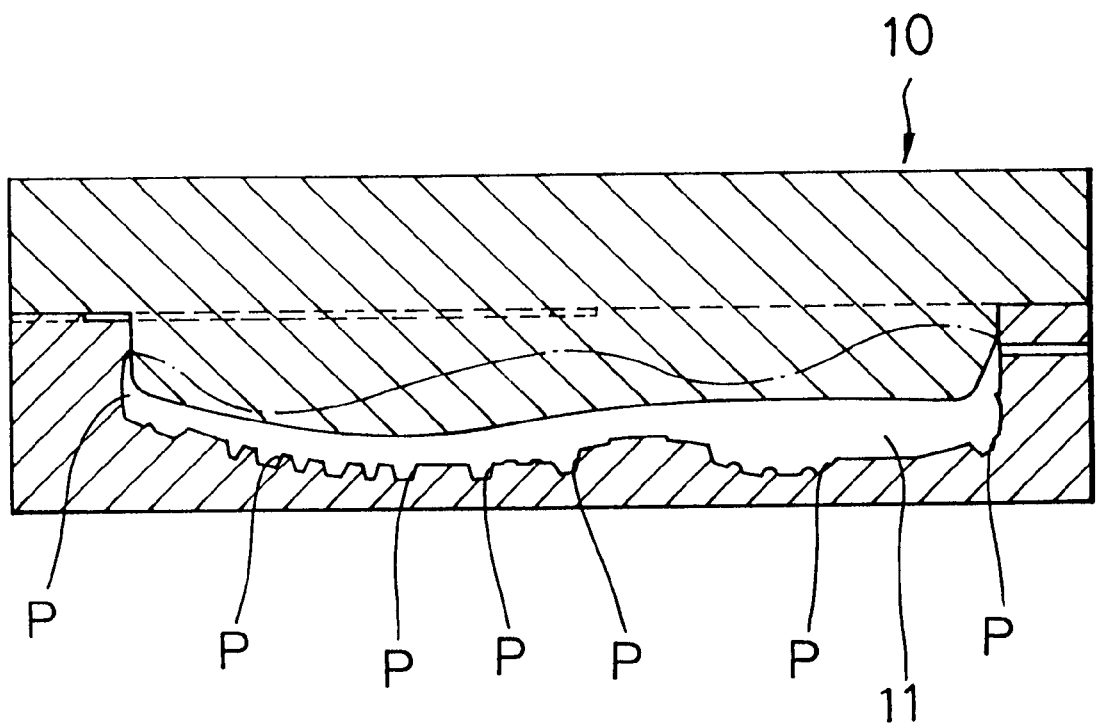
FIG. 2 is a sectional view showing how a shoe sole is molded via the conventional process.
Figure 4:
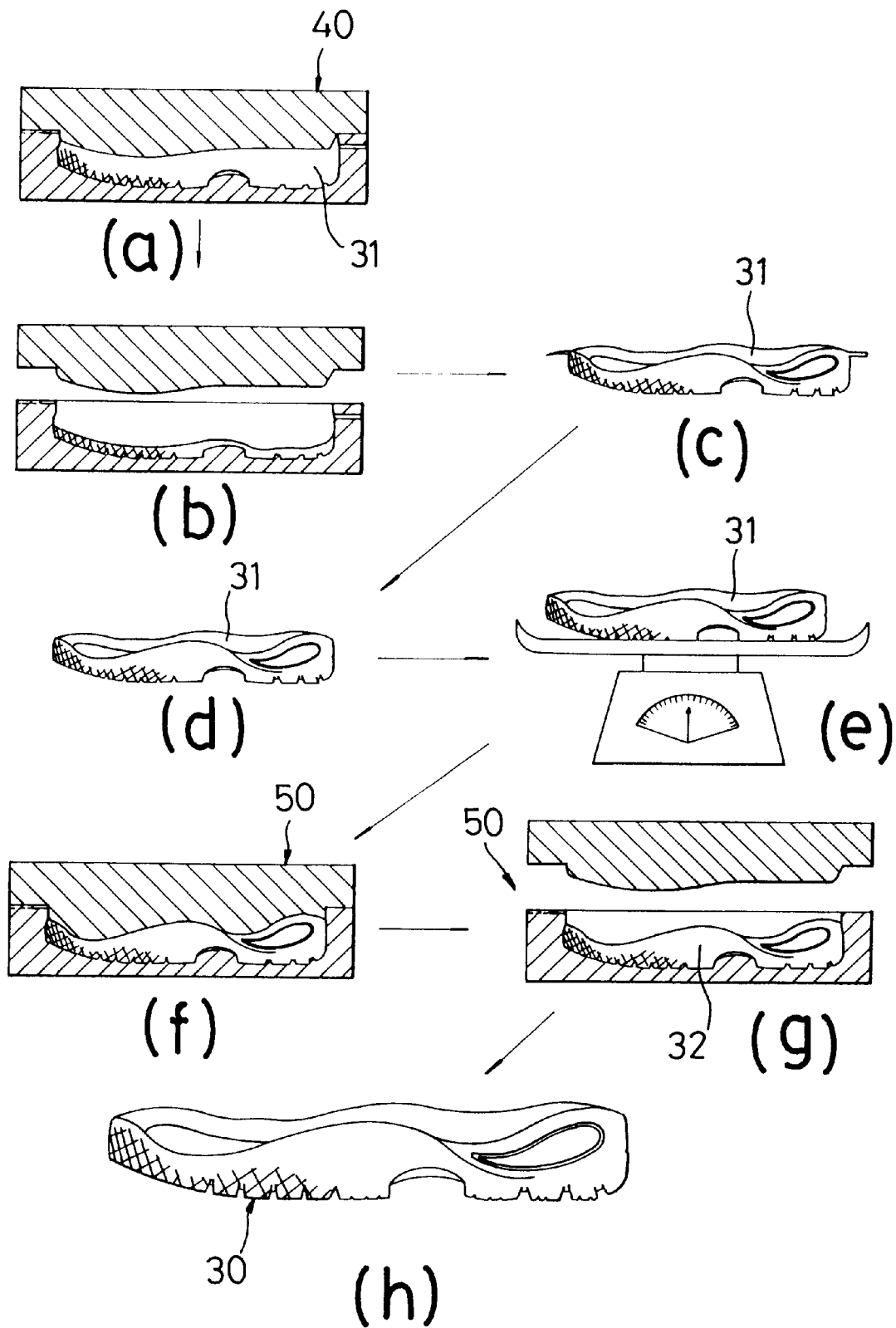
FIG. 4 schematically shows the different stages of the process of the first preferred embodiment.

Referring to FIGS. 3 and 4, there is shown a first preferred embodiment of the process according to the present invention for making a sole 30 from a foamable polyethylene vinyl acetate (EVA) molding composition which contains azodicarbonamide. FIG. 3 illustrates the preferred embodiment via a block diagram, while FIG. 4 demonstrates the preferred embodiment via stages (a) to (h). Stage (a) represents the stage of forming an unexpanded blank 31 in a first mold 40, stage (b) the stage of opening the mold 40, stage (c) the stage of removing the blank 31 with flash from the first mold 40, stage (d) the stage trimming the blank 31 to remove flash, stage (e) the stage of weighing the trimmed blank 31, stage (f) the stage of heating the blank 31 in a second mold 50 for crosslinking, stage (g) the stage of opening the second mold 50 for expansion of the cross-linked product, and stage (h) the stage of obtaining the finished sole 30 from the second mold 50.

In this preferred embodiment, the EVA molding composition in the form of granules is first heated to a temperature of 80° C.–100° C. to form a melt. The melt is then injected into the first mold 40 to form the unexpanded blank 31. The first mold 40 may be an injection mold or a compression mold. The injection is preferably carried out at a slow rate. After cooling the first mold 40, the blank 31 is taken out from the mold 40 and is then trimmed to remove flash. Afterwards, the blank 31 is inspected for its quality. If the quality is deficient, the blank 31 may be re-melted and re-molded for recycle.

If the quality of the blank 31 is satisfactory, it is weighed. If the weight of the blank 31 does not reach a predetermined weight, the blank 31 may be re-melted and re-molded, or the weight thereof may be corrected by use of added material which may be obtained by cutting the other unexpanded blanks or from segments of the other unexpanded blanks resulting from the trimming operation.

The qualified or corrected blank 31 is placed in the second mold 50 to undergo cross-linking under pressure at a temperature of 150–175° C. After cross-linking, the second mold 50 is opened to permit expansion of the cross-linked product 32. The expanded product is then taken out of the second mold 50 and cooled to a final product 30.

Preferably, the mold 40 is designed such that it has a mold cavity of the same shape and size as that of the second mold 50 so that the unexpanded blank 31 has the shape and size sufficient to fill the second mold cavity of the mold 50. The first mold 40 is provided with venting holes (not shown) to release air from the mold cavity thereof when the melted EVA composition is introduced into the first mold 40, thereby eliminating the problem of under-filling and minimizing voids formed in the unexpanded blank. The first and second molds 40 and 50 may be separate molds or the same mold. In case the first mold 40 with venting holes is used as the second mold 50, the venting holes should be blocked to prevent venting.

Figure 5:
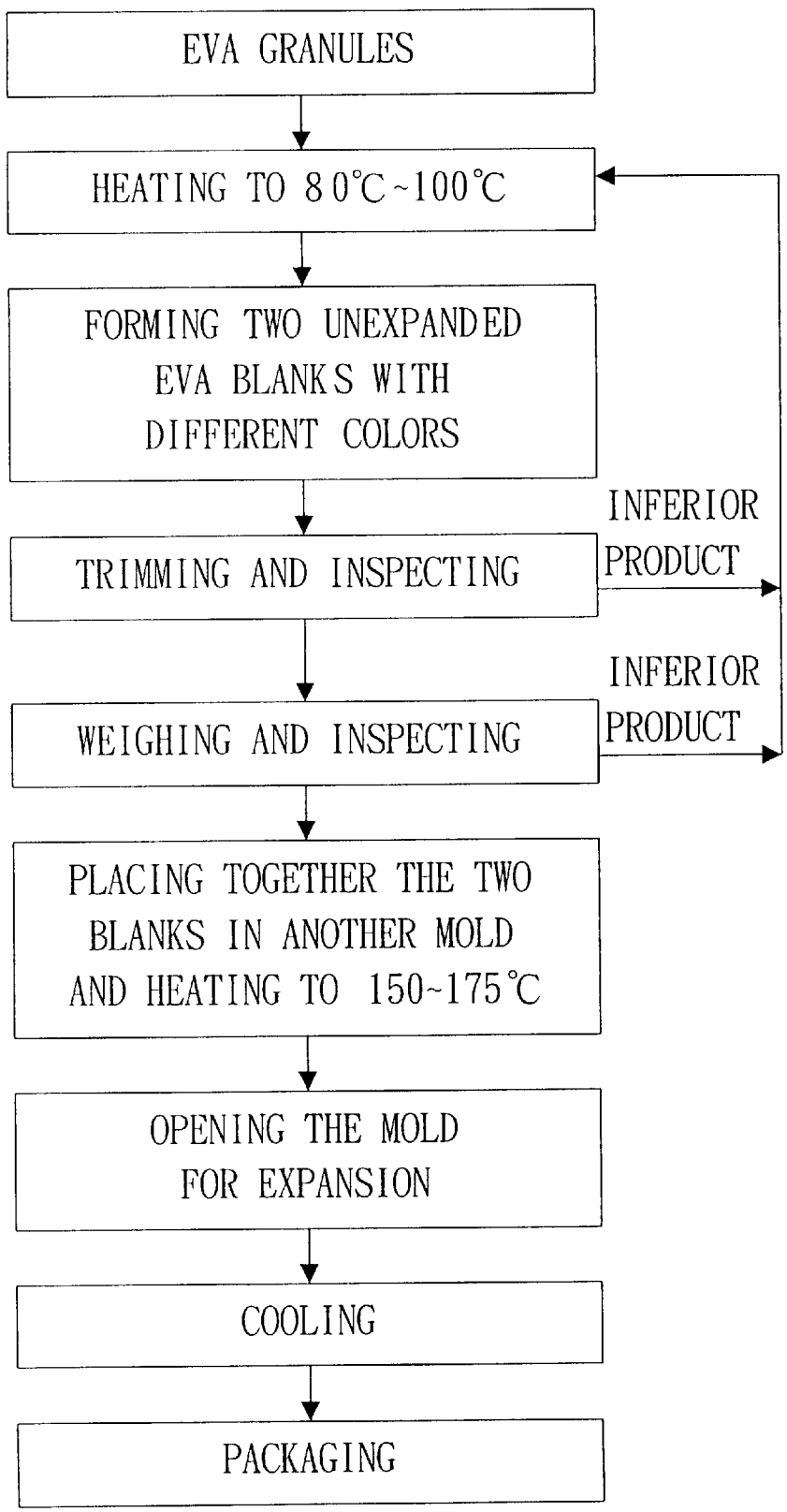
FIG. 5 is a flow diagram illustrating a second preferred embodiment of the present invention.
Figure 6:
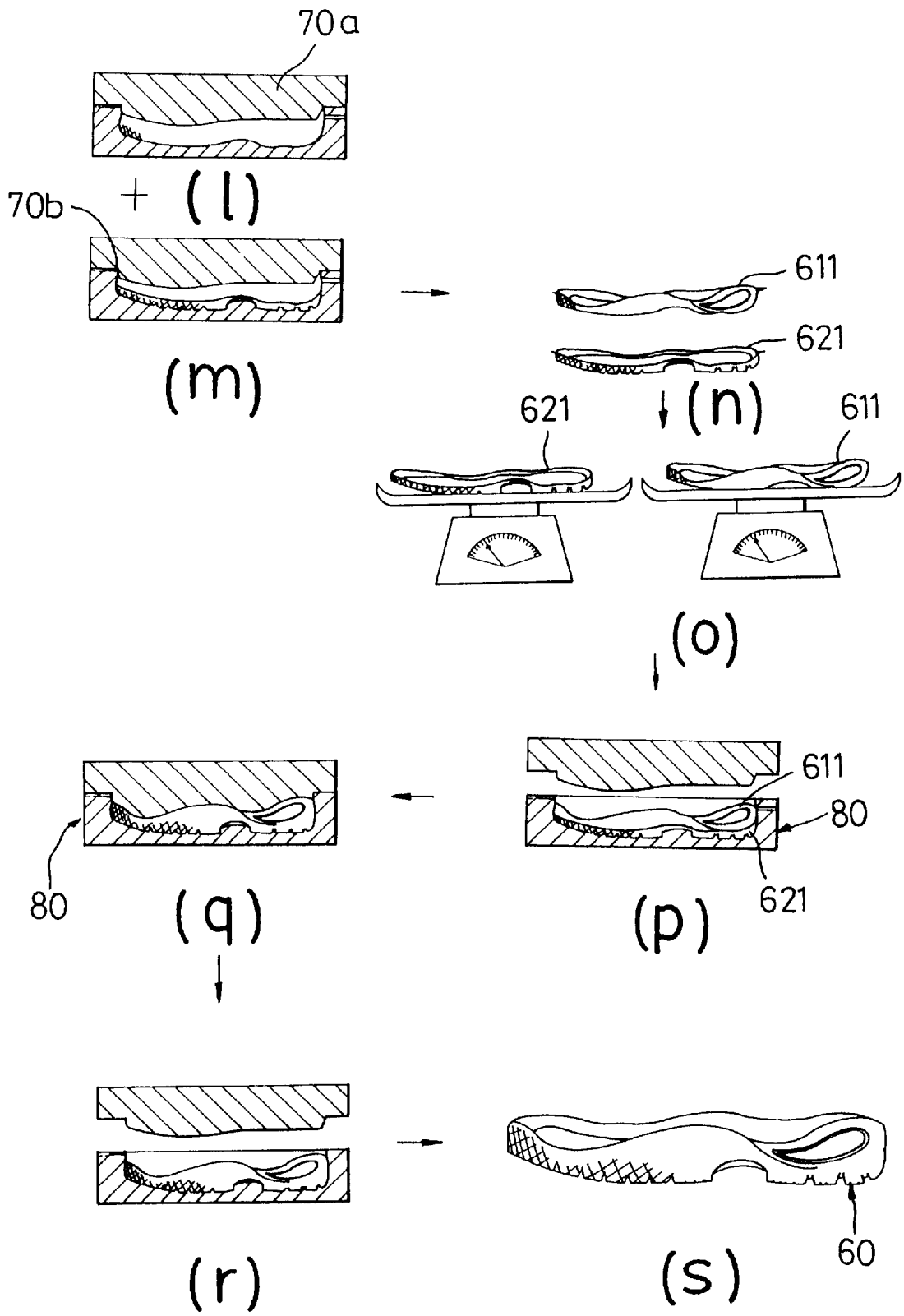
FIG. 6 schematically shows the different stages of the process of the second preferred embodiment.

FIGS. 5 and 6 illustrate a second preferred embodiment of the process according to the present invention for producing an outsole integral with a midsole. This embodiment is substantially the same as the first embodiment except that the unexpanded blanks for forming the outsole and midsole are separately formed before being placed together in a second mold for cross-linking and expandng.

FIG. 5 shows the second preferred embodiment via a block diagram, while FIG. 6 demonstrates the same via stages (l) to (s). Stage (l) represents the forming a midsole blank 611 in an injection mold 70a, stage (m) the stage of forming an outsole blank 621 in an injection mold 70b, stage (n) the stage of removing the blanks 611 and 621 from the molds 70a, 70b, stage (o) the stage of weighing the blanks 611 and 621, stage (p) the stage of placing the blanks 611, 621 together in a mold 80, stage (q) the stage of heating the blanks 611, 621 to undergo cross-linking in the mold 80, stage (r) the stage of opening the mold 80 for expansion, and stage (s) the stage of removing a combined midsole and outsole from the mold 80.

In this process, firstly, an EVA based foamable composition in the form of granules is melted at a temperature of 80° C.–100° C. Two or more EVA granular materials may be prepared by including therein different coloring agents.

An unexpanded blank 611 for forming a midsole is molded in an injection mold 70a, whereas an unexpanded blank 621 for forming an outsole is molded in an injection mold 70b. Alternatively, compression molds may be used in place of the injection molds 70a and 70b. The molding compositions to form blanks 611 and 621 are both prepared from polyethylene vinyl acetate. The compositions may have different colors. After forming the blanks 611 and 621, the blanks 611 and 621 are trimmed and then weighed separately. The unqualified blanks 611 and 621 may be re-melted for recycle.

The qualified blanks 611 and 621 are placed together in an expanding mold 80 and heated under pressure to a temperature of 150° C.–175° C. to cause the compositions of the blanks 611 and 621 to undergo cross-linking. Afterwards, the mold 80 is opened to permit the cross-linked product 63 to expand. The midsole and outsole blanks 611 and 621 are thereby combined and formed into a final expanded sole 60.

On the other hand, a combined midsole and outsole may be produced by forming the unexpanded outsole blank 621 only at the first molding stage in a mold and then placing the blank 621 in the other mold in the second molding stage where a midsole is formed directly onto the outsole by introducing a foamable EVA composition into the other mold. After the outsole blank 621 and the midsole EVA composition are heated to a temperature that causes the outsole blank to undergo cross-linking, they can be allowed to expand by opening the mold.

The present invention provides the following advantages:

1. Because the unexpanded blanks formed from the EVA melt in the first forming stage are subjected to inspection procedures for control of the weight and size thereof prior to the second stage of cross-linking and expanding the EVA molding composition and because the blanks which have not undergone a cross-linking reaction can be re-melted and re-molded, unqualified blanks upon inspection can be recycled, thereby saving the amount of the materials to be used and lowering the cost of manufacture. In addition, the inspection procedures prior to the second or final molding stage enable the blanks to be corrected with respect to their amounts to be fed into the second mold. As a result, the problems of under-filling the second mold can be alleviated, and the final products can exactly retain the shape and size of the mold cavity of the second mold, thereby eliminating any additional finishing procedure after the second molding stage.

2. Since the EVA melt is injected into the first mold at a slow rate, and since the first mold is vented, air residing in the first mold can be expelled effectively from the first mold, thereby preventing the molded product from being oxidized or becoming yellow and from being formed with voids. In addition, as the process according to the present invention does not require high injection pressure and rate, the cost of the equipment required in the process of the present invention can be cheap.

3. As the unexpanded blanks are formed at a low temperature, the equipment required for forming the blanks can be simplified, and the power requirement thereof is less, thereby lowering the cost of manufacture.

4. The EVA shoesole produced via the present invention exhibits uniform density, good dimensional stability and good skin characteristics.

With the invention thus explained, it is apparent that various modifications and variations can be made without departing from the spirit of the present invention. It is therefore intended that the scope of the invention be limited only as indicated in the appended claims.

I claim:

1. A process for making a foamed sole comprising:
   (a) forming at least one unexpanded blank in at least one first mold by introducing thereinto a resinous molding composition, which contains an agent capable of foaming and cross-linking the resinous molding composition, at a temperature lower than that which can cause the composition to expand and cross-link;
   (b) trimming the unexpanded blank to remove flash and inspecting the weight and size of the unexpanded blank; and
   (c) placing in a second mold the unexpanded blank having a predetermined weight and/or size and heating the unexpanded blank under pressure at a high temperature sufficient to cause the unexpanded blank to undergo cross-linking, and opening the second mold for expansion of the heated blank, whereby the sole so produced has good cross-linking characteristics and retains exactly the shape and size of the mold cavity of the second mold.

2. The process according to claim 1, wherein the resinous composition contains polyethylene vinyl acetate.

3. The process according to claim 1, further comprising the step of re-melting the unexpanded blank which has insufficient weight and/or size, after step (b), for reuse in step (a).

4. The process according to claim 1, further comprising the step of correcting the unexpanded blank, after step (b), to have a predetermined weight by adding thereto a material identical to the unexpanded blank.

5. The process according to claim 2, wherein the temperature in step (a) is 80° C.–100° C.

6. The process according to claim 5, wherein the temperature in step (c) is 150° C.–175° C.

7. The process according to claim 1, wherein two unexpanded blanks are formed separately in step (a) and then placed together in the second mold in step (c).

8. A process for making a shoesole comprising:
   (a) forming an unexpanded outsole blank in a first mold from a first resinous molding composition, which contains an agent capable of foaming and cross-linking the resinous molding composition, at a temperature lower than that which can cause the composition to expand and cross-link;
   (b) trimming the unexpanded outsole blank to remove flash and inspecting the weight and size of the unexpanded outsole blanks; and
   (c) after step (b), placing in a second mold the unexpanded outsole blank having a predetermined weight and/or size;
   (d) injecting an expandable second molding composition for forming a midsole onto the unexpanded outsole blank placed in the second mold; and
   (e) heating the unexpanded outsole blank and the injected second molding composition under pressure to a temperature sufficient to cause the unexpanded outsole blank to undergo cross-linking, and opening the second mold for expansion of the heated outsole blank and the heated second molding composition, whereby the shoesole so produced has good cross-linking characteristics and retains exactly the shape and size of the mold cavity of the second mold.

9. The process according to claim 8, wherein each of the first and second molding compositions contains polyethylene vinyl acetate.

* * * * *